US008398153B1

(12) United States Patent
Dandekar et al.

(10) Patent No.: US 8,398,153 B1
(45) Date of Patent: Mar. 19, 2013

(54) IMPACT DEFLECTOR FOR VEHICLE FRAME

(75) Inventors: Bhushan W. Dandekar, Rochester Hills, MI (US); Andrew W. White, Shelby Township, MI (US); Young Doe, Macomb, MI (US); Marcel R. Cannon, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/288,793

(22) Filed: Nov. 3, 2011

(51) Int. Cl.
*B62D 25/08* (2006.01)

(52) U.S. Cl. .................................. 296/187.09

(58) Field of Classification Search ............ 296/187.09, 296/187.1, 203.01, 204, 205, 203.02
See application file for complete search history.

(56) References Cited

U.S. PATENT DOCUMENTS

| | | | | |
|---|---|---|---|---|
| 7,954,884 B2 * | 6/2011 | Kosaka | ................. | 296/187.09 |
| 8,152,224 B2 * | 4/2012 | Faruque et al. | .......... | 296/187.09 |
| 2003/0025358 A1 * | 2/2003 | Taguchi et al. | .......... | 296/203.02 |
| 2008/0174150 A1 * | 7/2008 | Yamada | .................... | 296/203.01 |
| 2008/0238150 A1 * | 10/2008 | Nakamura et al. | ....... | 296/203.02 |
| 2009/0243336 A1 * | 10/2009 | Honji et al. | ............... | 296/187.09 |
| 2011/0148151 A1 * | 6/2011 | Abe et al. | ................. | 296/203.02 |
| 2012/0187719 A1 * | 7/2012 | Fujii et al. | ................ | 296/187.09 |
| 2012/0248819 A1 * | 10/2012 | Okamura et al. | .......... | 296/187.1 |
| 2012/0248820 A1 * | 10/2012 | Yasui et al. | .............. | 296/187.09 |

FOREIGN PATENT DOCUMENTS

JP  2000053022 A * 2/2000

* cited by examiner

*Primary Examiner* — H Gutman

(57) ABSTRACT

An impact receiving structure in a motor vehicle includes a vehicle frame having left and right frame rails extending longitudinally and cross frame rails extending transversely between the left and right frame rails. A vehicle body is mounted on the vehicle frame and has a transverse bulkhead and left and right A-pillars connected to the bulkhead. Left and right upper rails extend longitudinally above the front wheels and outboard of the left and right frame rails and are connected respectively to the left and right frame rails by left and right braces. Left and right deflector devices are mounted on the left and right frame rails forwardly of the front wheels and extend outwardly from the left and right frame rails to receive an impact force and transmit the impact force into the frame that would otherwise transmit through the left and right upper rail structures.

19 Claims, 2 Drawing Sheets

IMPACT DEFLECTOR FOR VEHICLE FRAME

FIELD OF THE INVENTION

The present invention relates to a frame for a motor vehicle and more particularly relates to an impact deflector that transfers an impact load into the frame.

BACKGROUND OF THE INVENTION

Many motor vehicles are built on a full frame that includes left and right frame rails connected by cross members so as to form a ladder like frame structure. In this type of construction, the frame and the vehicle body are constructed separately, and each is a complete unit by itself. The left and right frame rails run the length of the vehicle between the front bumper and the back bumper. The front and rear axles are mounted on the frame. The engine and transmission are mounted on the frame, either directly or by an engine cradle that bolts to the frame. The vehicle body is married to the frame and includes a bulkhead that separates the occupant compartment from the engine compartment. Fenders and a radiator support are then mounted on the frame and the bulkhead to surround the engine.

In a frontal impact situation, the various structures of the vehicle will become deformed and thereby receive and dissipate the impact loads imposed thereon.

It would be desirable to provide alternative vehicle constructions that would provide new and different management of impact loads in which loads that would otherwise be transferred into the body are, instead, transferred into the frame.

SUMMARY OF THE INVENTION

An impact receiving structure in a motor vehicle includes a vehicle frame having left and right frame rails extending longitudinally and cross frame rails extending transversely between the left and right frame rails. A vehicle body is mounted on the vehicle frame and has a transverse bulkhead and left and right A-pillars connected to the bulkhead. Left and right upper rails extend longitudinally above the front wheels and outboard of the left and right frame rails and are connected respectively to the left and right frame rails by left and right braces. Left and right deflector devices are mounted on the left and right frame rails forwardly of the front wheels and extend outwardly from the left and right frame rails to receive an impact force and transmit the impact force into the frame that would otherwise transmit through the left and right upper rail structures.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 2:
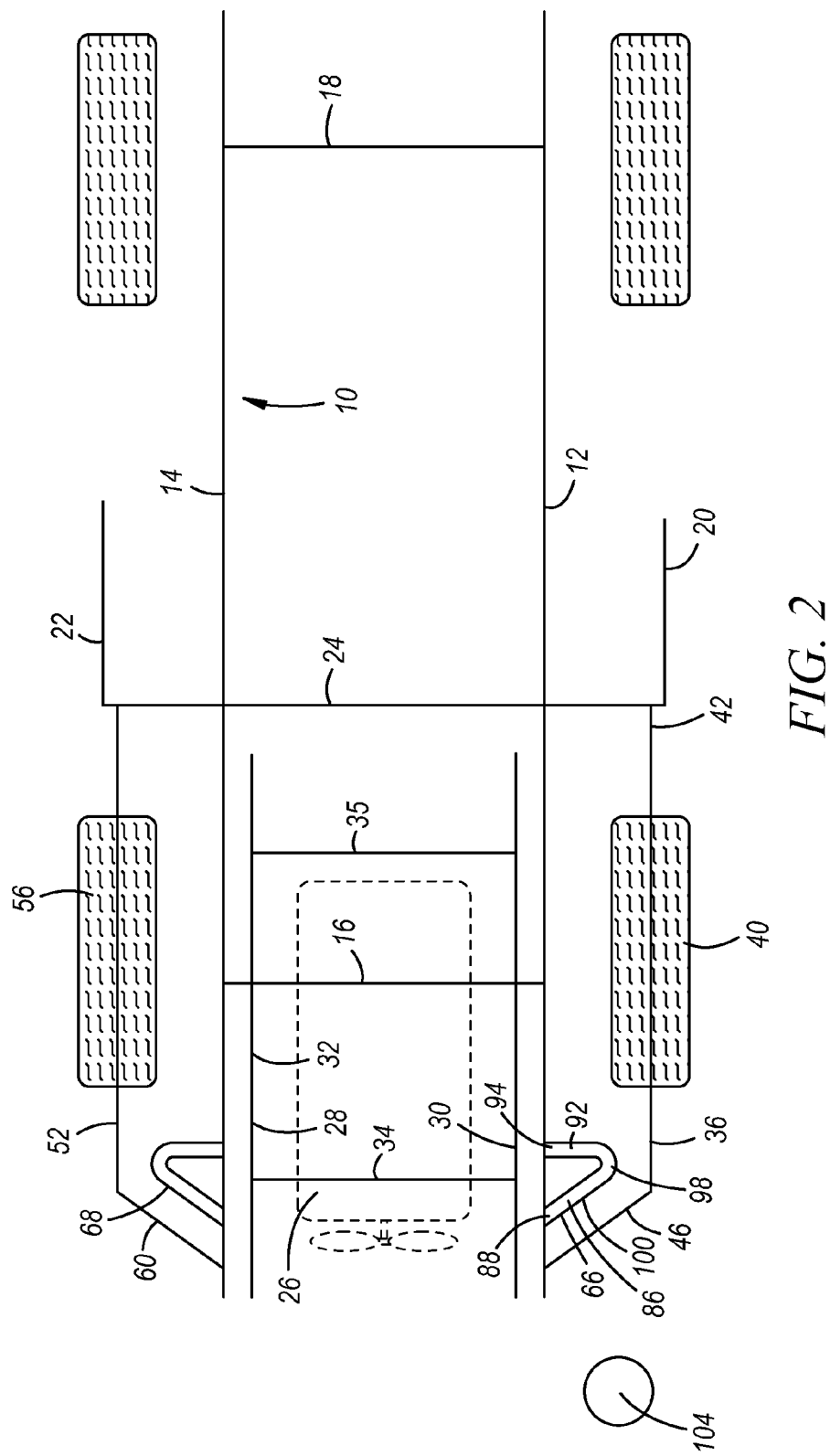
FIG. 2 is a simplified schematic of the vehicle frame and front end structure.

FIG. 2 is a simplified schematic representation of a vehicle body frame and front end structure. A ladder-like vehicle frame 10 includes a left frame rail 12 and a right frame rail 14 that extend longitudinally of the vehicle and are connected together by a front cross member 16 and a rear cross member 18 that extend transversely between the longitudinal extending frame rails 12 and 14. Additional cross members may be provided in order to strengthen the frame 10.

Thus, the term longitudinal refers to a member that extends lengthwise of the vehicle, the term transverse refers to a member that extends crosswise of the vehicle, and the term diagonal used herein refers to a member that extends at an angle to the longitudinal and transverse directions.

A vehicle body will be mounted on the vehicle frame 10 and includes a bulkhead 24 that forms a wall between an engine compartment located forwardly of the bulkhead 24 and a passenger compartment located rearwardly of the bulkhead 24. The vehicle body also includes a left A-pillar 20 and a right A-pillar 22. The A-pillars 20 and 22 support the ends of the bulkhead 24 and also provide for mounting of the vehicle's front door hinges and the windshield.

A vehicle engine and transmission 26, is mounted on the vehicle frame 10 by an engine cradle 28 that includes a left cradle rail 30 and a right cradle rail 32. These cradle rails 30 and 32 extend longitudinally and are connected by cradle cross members 34 and 35.

Additional structure for the vehicle front end is provided for mounting the front fenders and includes a left upper rail 36 that extends longitudinally above front left wheel 40 and has a rear end 42 attached to the bulkhead 24 and a brace 46 that extends between the left upper rail 36 and the front end of the left frame rail 12. The brace 46 is shown to extend diagonally in FIG. 2, but can also extend transversely. Likewise, a right upper rail 52 extends longitudinally above front right wheel 56 and is connected to the front end of the right frame rail 14 by a brace 60.

A left-hand deflector device 66 is mounted on the left frame rail 12 and extends outwardly from the left frame rail 12 forwardly of the front left wheel 40. A similar right-hand deflector device 68 is mounted on the right frame rail 14 forwardly of the front right wheel 56.

Figure 1:
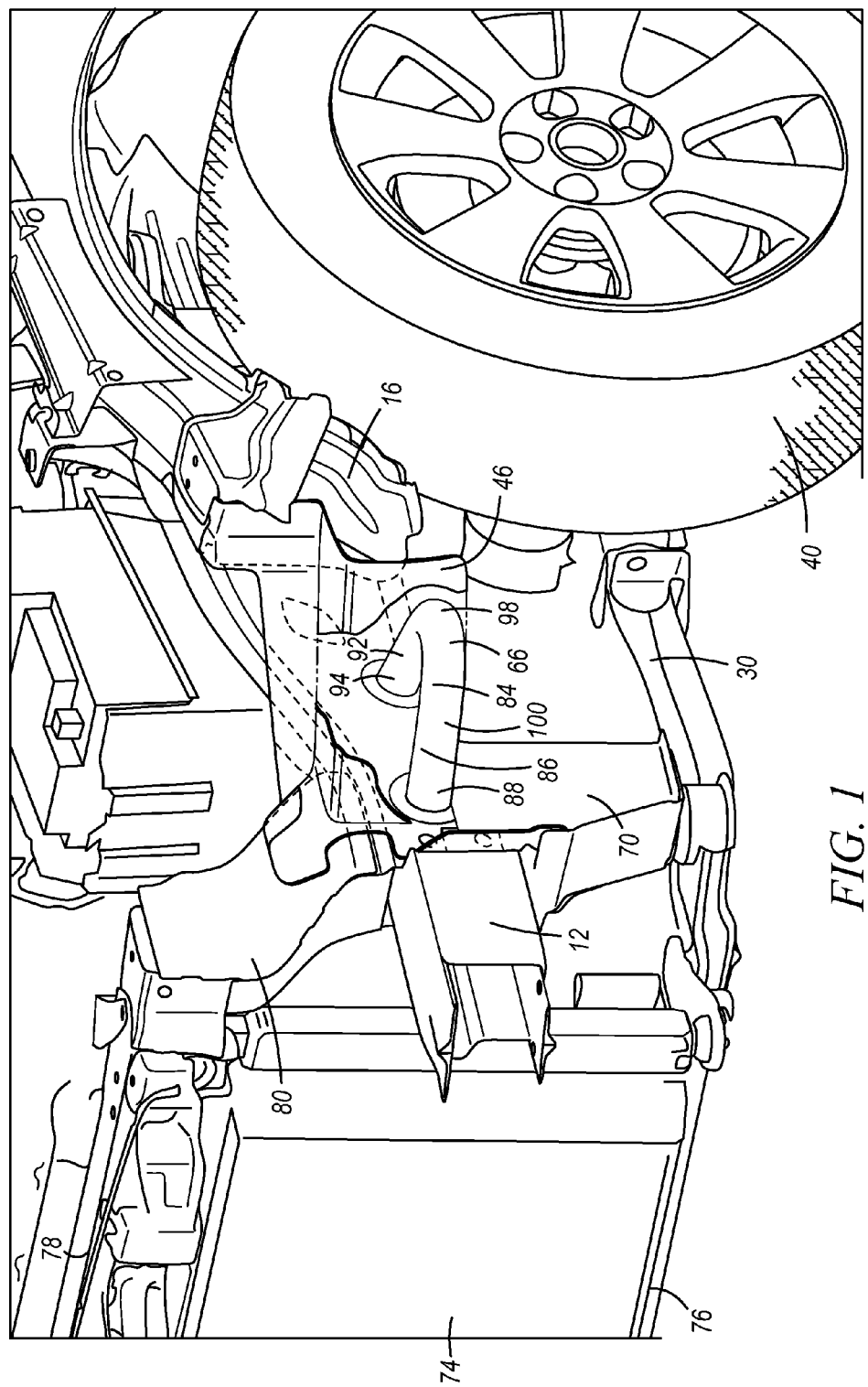
FIG. 1 is a perspective view showing the front end structure of the vehicle body including a frame rail with an impact deflector.

FIG. 1 is a perspective view of the motor vehicle showing the various components described above. It is seen that the left cradle rail 30 is situated generally beneath the left frame rail 12, and a cradle support member 70 extends downwardly from the left frame rail 12 to attach the left cradle rail 30 to the left frame rail 12. The left upper rail 36 is shown at its location extending longitudinally above the front left wheel 40, and the brace 46 is suitably welded to the front end of the left upper rail 36 and the left frame rail 12. Additional structure shown in FIG. 1 includes a radiator 74 that is mounted on a lower transverse radiator support 76 and an upper transverse radiator support 78. The lower transverse radiator support 76 is suitably attached to the forward of the left cradle rail 30. The upper transverse radiator support 78 is suitably attached to the left frame rail 12 by a radiator tie support 80.

The deflector device 66 is shown in FIG. 1 and is seen to be comprised of a U-shaped or V-shaped tubular member 84 having a forward leg 86 with a forward inboard end 88 suitably welded to the left frame rail 12, and a rearward leg 92 having a rearward inboard end 94 that is suitably welded to the left frame rail 12 rearwardly of the forward end 88. The tubular member 84 has an outboard end 98 at the juncture of the forward leg 86 and the rearward leg 92. In FIG. 2, the forward leg 86 is extending diagonally and provides a forward facing impact surface 100 that is angled rearwardly somewhat. The rearward leg 92 is extending transversely in FIG. 2.

Referring again to FIG. 2, an obstacle such as a pole 104 is shown. The pole 104 is representative of the many types of obstacles or objects that the vehicle may counter in an impact situation. The pole 104 is offset from the centerline of the vehicle and lies outboard of the left frame rail 12. In event of impact with the pole 104, the impact load would ordinarily be transferred substantially through a path including the brace 46, the left upper rail 36, and into the bulkhead 24 and the A-pillar 20. However, as best seen in FIG. 2, the deflector device 66, particularly its forward facing impact surface 100, is positioned to accept a substantial portion of the impact of the pole 104. Upon receiving the impact, the rearward leg 92 will function to support and strengthen the position of the forward leg 86 and transfer the impact load into the left frame rail 12. In addition, the rearward angle of the forward facing impact surface 100 will cause the impact to be deflected laterally and may actually deflect the vehicle rightwardly away from the pole 104. Accordingly, impact loads that would have been transferred through the left upper rail 36 and into the vehicle body via the bulkhead 24 and A-pillar 20, will instead be taken and managed within the structure of the vehicle frame 10.

It will be appreciated that the performance of the impact receiving deflecting device 66 can be tuned by varying the dimensions and location of the deflector device 66. For example, in FIG. 2, the deflecting device 66 extends outwardly from the frame rail 12 such that the outboard end 98 of the deflecting device 66 is generally aligned with the inboard edge of the front left wheel 40. However, the outboard end 98 could be positioned either further outboard to overlap more with the front left wheel 40 or the outboard end 98 could be closer into the left frame rail 12. Furthermore, FIG. 2 shows the deflector device 66 located rearwardly of the brace 46. However, the deflector device 66 can be located more forwardly on the frame rail 12 to be either closer to the brace 46. The deflector device 66 can be located forwardly of the brace 46, or in line with the brace 46, or rearwardly of the brace 46. In addition, the angle of the impact receiving device 66 can be varied to tune the impact receiving effectiveness. Furthermore, in the vertical location, the impact receiving device 66 can also be varied by vertically raising or lowering its point of attachment to the left frame rail 12. In determining the size and location of the deflector device 66, it is important to realize that the front left wheel 40 turns left and right as the vehicle is turned and also bounces up and down as the vehicle is driven. Accordingly, the deflector device 66 must be sized and positioned such that it will not interfere with the necessary and appropriate movement of the front left wheel.

It will be understood that in an impact situation there will be a general deformation of the front end structure with each of the deforming members contributing to the management of the impact loads. However, the impact receiving device 66 described herein can be tuned to transfer into the vehicle frame a substantial portion of the impact loads that would otherwise be transmitted into the vehicle body.

What is claimed is:

1. An impact receiving structure in a motor vehicle having left and right front wheels comprising:
    a vehicle frame having left and right frame rails extending longitudinally and cross frame rails extending transversely between the left and right frame rails;
    a vehicle body mounted on the vehicle frame and having a transverse bulkhead and left and right A-pillars connected to the bulkhead;
    left and right upper rails extending longitudinally above the front wheels and outboard of the left and right frame rails and connected respectively to the left and right frame rails by left and right braces;
    and left and right deflector devices mounted on the left and right frame rails forwardly of the front wheels and extending outwardly from the left and right frame rails to receive an impact force and transmit the impact force into the frame that would otherwise transmit through the left and right upper rail structures;
    each of the left and right deflector devices having a forward leg and a rearward leg, each of the legs having an inboard end attached to the frame rail.

2. The impact receiving structure of claim 1 further comprising the deflector device being of tubular construction.

3. The impact receiving structure of claim 1 further comprising the deflector device being U-shaped or V-shaped.

4. The impact receiving structure of claim 1 further comprising the deflector device being of tubular construction and the forward leg extending diagonally of the vehicle and the rearward leg extending transversely of the vehicle.

5. The impact receiving structure of claim 1 further comprising the forward leg being located rearwardly of the brace, forwardly of the brace, or in line with the brace.

6. The impact receiving structure of claim 1 further comprising the left and right deflector devices each being of U-shaped tubular construction and having forward and rearward legs attached to the frame rail, with the forward leg extending diagonally and providing an impact receiving surface.

7. The impact receiving structure of claim 6 further comprising the rearward leg extending transversely to support the forward leg and transfer the impact load into the frame rail.

8. The impact receiving structure of claim 7 further comprising the impact receiving surface of the forward leg being located rearwardly of the brace, forwardly of the brace, or in line with the brace.

9. The impact receiving structure of claim 7 further comprising the extent of the impact force transmitted respectively into the frame and into the left and right upper rail structures being tuned by selection of the shape, position, and size of the deflector device.

10. An impact receiving structure in a motor vehicle having left and right front wheels, comprising:
    a vehicle frame having left and right frame rails extending longitudinally and cross frame rails extending transversely between the left and right frame rails;
    a vehicle body mounted on the vehicle frame and having a transverse bulkhead and left and right A-pillars connected to the bulkhead;
    left and right upper rails extending longitudinally above the front wheels and outboard of the left and right frame rails and connected respectively to the left and right frame rails by left and right braces;
    and left and right deflector devices mounted on the left and right frame rails forwardly of the front wheels and extending outwardly from the left and right frame rails to receive an impact force and transmit the impact force into the frame that would otherwise transmit through the left and right upper rail structures, each deflector device having a forward leg and a rearward leg, each of the legs having an inboard end attached to the frame rail and each having outboard ends connected with each other, the forward leg extending diagonally and having an impact receiving surface.

11. The impact receiving structure of claim 10 further comprising the deflector device being of tubular construction.

12. The impact receiving structure of claim 10 further comprising the deflector being U-shaped or V-shaped.

13. The impact receiving structure of claim 10 further comprising the rearward leg extending transversely of the vehicle.

14. The impact receiving structure of claim 10 further comprising the forward leg being located rearwardly of the brace, forwardly of the brace, or in line with the brace.

15. The impact receiving structure of claim 10 further comprising the extent of the impact force transmitted respectively into the frame and into the left and right upper rail structures being tuned by selection of the shape, position, and size of the deflector device.

16. An impact receiving structure in a motor vehicle having left and right front wheels, comprising:
   a vehicle frame having left and right frame rails extending longitudinally and cross frame rails extending transversely between the left and right frame rails;
   a vehicle body mounted on the vehicle frame and having a transverse bulkhead and left and right A-pillars connected to the bulkhead;
   left and right upper rails extending longitudinally above the front wheels and outboard of the left and right frame rails and connected respectively to the left and right frame rails by left and right braces;
   and left and right deflector devices mounted on the left and right frame rails forwardly of the front wheels and extending outwardly from the left and right frame rails to receive an impact force and transmit the impact force into the frame that would otherwise transmit through the left and right upper rail structures, each being a tube bent to a U-shape or V-shape providing forward and rearward legs attached to the frame rail and an outboard end, said forward leg providing a impact receiving surface located outboard the frame rail to receive an impact.

17. The impact receiving structure of claim 16 further comprising the forward leg extending diagonally and the rearward leg extending transversely of the vehicle.

18. The impact receiving structure of claim 16 further comprising the forward leg being located rearwardly of the brace, forwardly of the brace, or in line with the brace.

19. The impact receiving structure of claim 16 further comprising the extent of the impact force transmitted respectively into the frame and into the left and right upper rail structures being tuned by selection of the shape, position, and size of the deflector device.

\* \* \* \* \*